June 5, 1962   R. F. STEYSKAL   3,037,405
MICROMETER DEPTH GAGE
Filed Aug. 24, 1959
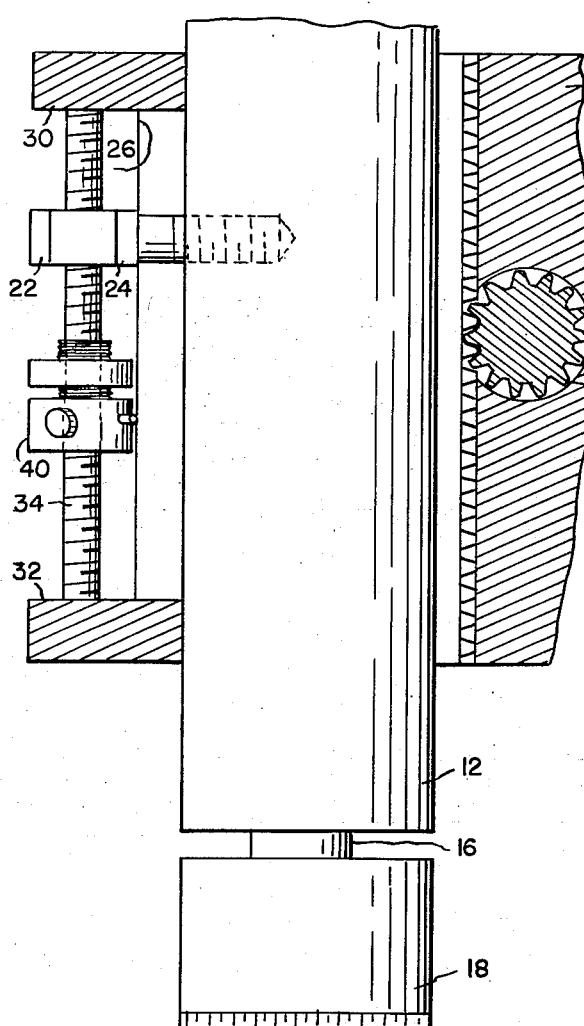
FIG.1.
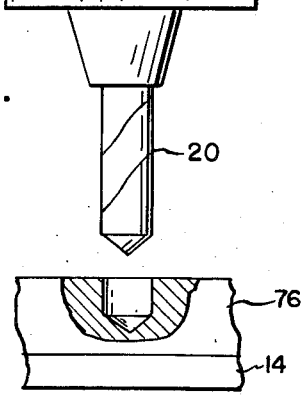
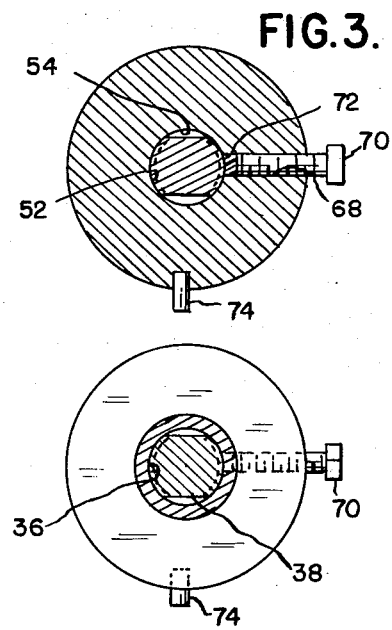
FIG.2.
FIG.3.
FIG.4.
INVENTOR.
REX F. STEYSKAL
BY Whittemore Hulbert
& Belknap
ATTORNEYS 3,037,405
MICROMETER DEPTH GAGE
Rex F. Steyskal, Roseville, Mich., assignor of one-third to Francis W. Zimmerman, Royal Oak, and one-third to Jack C. Zimmerman, Troy, Mich.
Filed Aug. 24, 1959, Ser. No. 835,753
3 Claims. (Cl. 77—34.5)

This invention relate to a micrometer depth gage for use with machine tools. More particularly, this invention relates to a rapid setting or motion limiting device adapted to be used on mills or similar machine tools where it is desired to accurately control and to provide an expeditious and precise adjustment of the movement between a movable member and a fixed member. The invention has many applications in machine tool operations and has provisions for an improved micrometer adjustment which may be used with various milling, drilling, grinding, routing and spot-facing operations.

The invention provides a small, compact micrometer depth gage adapted to be manipulated by hand quickly and readily along a longitudinal member or shaft and to be locked thereupon at a predetermined position with considerable ease of operation. Although, as stated above, the invention has many different applications, the invention will be described as a means for controlling or limiting the relative movement between the vertically movable quill member and the fixed portion of a milling machine.

The customary depth gage and stop for indicating the vertical position and limiting the movement of the quill of the milling machine with respect to the fixed portion usually requires a short threaded rod extending upwardly between a pair of abutments. A quill stop affixed to the movable quill extends laterally to enclose the threaded rod and cooperates with a nut which is threadedly engageable with the rod. By rotation, the nut may be moved upwardly or downwardly along the threaded rod to the desired position. When the quill is moved downwardly the projecting lug or quill stop will engage the nut to limit or stop further downward movement. The nut usually cooperates with the scale mounted on the housing of the milling machine to indicate the range of vertical movement of the quill.

This type of construction has provided many disadvantages. Whenever it is necessary to change the depth gage, the machine operator must screw the stop nut along the threaded rod to the desired location. Such a tedious operation consumes valuable time and effort particularly when it is necessary to move the nut along the rod more than a fraction of an inch. Another disadvantage is that unless a lock nut is also provided on the threaded rod, vibration of the machine may cause the nut to rotate on the rod thereby changing the desired setting. When such a locking arrangement is provided the machine operator must thread both nuts along the rod to the desired position and then lock them together. This type of a finger adjustment results in the operator obtaining sore and tired fingers. Various ways have been employed in overcoming this problem such as by utilizing springs or other resilient means engaging in compression the rod and nut.

In accordance with the present invention, a fast changing and easily adjustable device is provided whereby the depth stop surface can be moved very easily from one position to another without the use of springs where it will remain without movement even when considerable vibration occurs. A micrometer member is provided so that the depth stop located on the member can be positioned with extreme accuracy which is very important in machining operations.

It is an object of the present invention to provide an improved micrometer depth gage which is simple, durable and of inexpensive construction and which is capable of easy manual manipulation.

Another object of the invention is to provide a micrometer cutting depth adjustment that can be easily released and moved longitudinally along a threaded shaft and quickly relocked at any desired place on the shaft.

Still another object of the invention is to provide an assembly comprising a cylindrical element or barrel and a micrometer member or nut adjustably connected to the barrel for obtaining precise adjustment, said assembly being disengaged from a threaded rod by a short angular movement thereof.

A further object of the invention is to provide an easily adjustable device which may be selectively engaged with or disengaged from the threads of a threaded shaft.

A still further object of the invention is to provide a stop device having a barrel portion and a micrometer member threadedly engageable with the barrel, said member having a scale thereon graduated in divisions in thousandths of an inch.

Another object of the invention is to provide a structure having a radial locating pin for engaging the fixed portion of the machine tool and thereby provide repetitive accuracy and reliability.

These and other objects will become more apparent as the description proceeds, especially in conjunction with the accompanying drawings, wherein:

FIG. 1 is an elevational view, partly in section showing the invention operatively connected to a mill or similar machine tool.

FIG. 2 is a sectional view of the invention showing the micrometer depth gage in a locked position on the threaded rod.

FIG. 3 is a sectional view taken on line 3—3 of FIG. 2.

FIG. 4 is a partial sectional view taken on line 4—4 of FIG. 2.

In the drawings, numeral 10 designates part of the housing of a machine tool such as a mill or similar device. A vertically movable member or quill 12 is slidably mounted within the housing 10 and is positioned directly above a work supporting platform or table 14. A spindle 16 is journaled in the quill 12 and carries a tool holder 18 for a tool 20. A quill lug or stop 22 projects from the quill 12 and has an abutment 24 thereon. A slot 26 is provided in the housing 10 to permit the quill stop 22 to reciprocate with the quill 12 without any interference from the housing 10.

The spindle and quill assembly may be reciprocated in the housing 10 by any suitable means such as, by way of example, a rack and gear assembly 28 mounted in the housing 10 and movable by suitable means (not shown) such as a lever or handle.

A pair of abutments 30 and 32 are located on the housing 10. An upstanding stop rod 34 extending parallel to the quill axis is located in position between the abutments 30 and 32 by any suitable means. The rod 34 has a pair of alternate sections which form the threaded sections 36 and the flat parallel faces 38. The micrometer depth gage 40 is located on the rod 34 and cooperates in a simple and novel manner as will be described in detail later.

The plane of the flat lower face 24 of the projection or quill stop 22 is substantially at right angles to the axis of the rod 34. FIGS. 2–5 show the sectional assembly and various horizontal sectional views of the micrometer depth gage 40 which is slidable and adjustable on the rod 34 without the use of any spring means.

The micrometer depth gage 40 comprises essentially a hollow and threaded barrel or member 42 in the shape of an inverted T and a micrometer nut or member 44 which threadedly engages the barrel 42. The barrel or member 42 has a cylindrical portion 46 and a flange portion 48. A hollow bore 50 extends through the barrel 42 and has therein a pair of alternate sections of threaded portions 52 and non-threaded portions 54 which cooperate with the threaded sections 36 and the flat faces 38 respectively. The number of threads per inch in the bore 58 corresponds to the number of threads per inch on the rod 34.

The outer periphery of the cylindrical portion 46 is continuously threaded as designated by the numeral 52 and may have, as an example, 20 threads per inch. The micrometer member 44 has a lower knurled portion 54. The upper portion of the member 44 has a cylindrical face 56 which is engraved to form a scale therearound with equally spaced divisions. The calibrations on the scale are in thousandths of an inch. As an example with 20 threads per inch (lead of the threads is .050 inch) on the cylindrical portion 46, the member 44 has 50 calibrations so that each scale division or calibration will represent $\frac{1}{1000}$ of an inch of actual longitudinal movement of the member 44 on the barrel 42. This last figure is obtained by dividing the number of calibrations into the lead of the threads. One complete revolution of the micrometer member 44 will advance the member .050 inch. Rotating the member one calibration will advance the member .001 inch.

With such an arrangement, it is possible to obtain any division between the pitch of the threads in thousandths of an inch and thereby obtain repetitive accuracy.

The flange 48 has an upper and lower surface 60 and 62 respectively. The member 44 has an upper and lower surface 64 and 66 respectively. The surface 60 has a notch, slot, line or other measuring means thereon so as to guide the machine operator when reading a scale (not shown) usually provided on the housing 10. The flange 48 has a horizontal radial threaded portion 68 for receiving the adjusting screw 70 which locks and sets the barrel 42 when in threaded engagement with the rod 34. A plastic insert 72 cushions the screw 70 against the threads on the rod 34. A locating pin 74 protrudes from the side of the flange 48 in the same horizontal plane as the adjusted screw 70 and provides a radial stop surface which engages an abutment provided on the housing 10 as shown in FIGURE 1. The pin 74 will insure repetitive accuracy within plus or minus .001 (depending on the scales) when the device 40 is raised or lowered on the rod 34.

In operation, the micrometer depth gage is adjusted so that the lower surface 66 of the micrometer member 44 is separated from the upper surface 60 of the flange 48 by approximately $\frac{1}{32}$ to approximately $\frac{3}{32}$ of an inch. This space will permit the member 44 to be moved upwardly or downwardly after the barrel 42 has been set. The device 40 is angularly rotated after initially loosening the adjusting screw 70 to disengage the threaded sections 36 and 52. The quill 12 is lowered to bring the end of the cutting tool 20 into engagement with a workpiece 76 supported on the platform 14. This is known as picking up the work with the tool. With the tool 20 engaging the work 76 the device 40 is moved longitudinally along the rod 32 with the threaded sections 36 and 52 unengaged until the upper surface 64 engages the abutment surface 24 of the quill stop 22. The member 46 is angularly threaded approximately one-quarter revolution until the locating pin 74 engages an abutment on the housing 10 as shown in FIGURE 1. This indicates that the threaded sections 36 and 60 are fully engaged.

A measurement is taken from the vertically mounted scale (not shown) by reading the scale with reference to the horizontal portion of the upper surface 60 of the flange 48. If it is desirable to obtain a depth, as an example, of .503 inch, the .500 of an inch adjustment is obtained by adding the .500 of an inch to the initial scale reading, the engaged sections 36 and 52 are unfastened and moved (in this case lowered) to the new position where the sections 36 and 52 are re-engaged with the adjusting pin 74 abutting the housing 10. The adjusting screw 70 is fastened to engage one of the threaded sections 36 and prevent angular rotation of the barrel 42.

As previously mentioned, each graduation or division of the member 44 moves the member 44 vertically .001 inch. Continuing with the example, the precision adjustment of the device 40 is obtained by moving the member 44 three complete divisions in a clockwise direction to obtain the additional depth of .003 of an inch. If it would be required to drill the work to a depth of .497 inch the same procedure would be followed with the exception that the nut 44 would be rotated in a counterclockwise direction to obtain a minus .003 reading. The quill 12 is lowered until the quill stop 22 engages the precisely located stop surface 64. This arrangement will result in the required depth in the workpiece 76.

It is readily apparent that the location of the scale on the housing 10 and the reading thereof are all relative. Various sorts of measuring means and techniques may be employed in utilizing this invention. It should be observed that only a quarter of a revolution is required to disengage the barrel 42 from the rod 34 after the locking or adjusting screw 70 has been unfastened. The correlation between the pitch of the external threads 52 of the barrel 42 and the pitch of the threads on the micrometer member 44 provide accurate means for precisely locating the stop surface 64 with reference to the stop abutment 24.

The drawings and the foregoing specification constitute a description of the improved micrometer depth gage in such full, clear, concise and exact terms as to enable any person skilled in the art to practice the invention, the scope of which is indicated by the appended claims.

What I claim as my invention is:

1. An adjustable micrometer depth gage for a machine tool provided with an abutment comprising a threaded rod, a barrel threaded on said rod for rotation and longitudinal movement thereon, a flange on one end of said barrel extending outwardly from the axis of said barrel, the remaining portion of said barrel being provided with threads on the outside surface thereof, a micrometer member threaded on the outside surface of said barrel, the side of said micrometer member opposite the other end of said barrel providing a stop surface, a locator projecting outwardly from the flange on said barrel which is effective upon rotation of said barrel on said rod to engage the abutment on the machine tool thereby limiting the rotation of said barrel on said rod to an angular extent which is less than 360 degrees, and means for fixing said barrel on said rod at a position determined by said locator and the abutment, said micrometer member being adjustable on said barrel to accurately locate said stop surface on said barrel in between the lead of the threads on the outside surface of said barrel.

2. An adjustable micrometer depth gage for a machine tool provided with an abutment comprising a threaded rod, a barrel threaded on said rod for rotation and longitudinal movement thereon, a flange on one end of said barrel extending outwardly from the axis of said barrel, the remaining portion of said barrel throughout its entire length being provided with threads on the outside surface thereof, a micrometer member threaded on the outside surface of said barrel, said member having a height less than the length of said remaining portion of said barrel, the side of said micrometer member opposite the other end of said barrel providing a stop surface, a locator projecting outwardly from the flange on said barrel which is effective upon rotation of said barrel on said rod to engage the abutment on the machine tool thereby limiting the rotation of said barrel on said rod to an angular extent which is less than 360 degrees, and an adjustable threaded lock screw extending through said flange for fixing said barrel on said rod at a position determined by said locator and the abutment, said micrometer member being adjustable on said barrel to accurately locate said stop surface on said barrel in between the lead of the threads on the outside surface of said barrel.

3. An adjustable micrometer depth gage for a machine tool provided with an abutment comprising a threaded rod having threaded and non-threaded portions, a barrel surrounding said rod and having portions corresponding to the threaded and non-threaded portions of said rod, said barrel being adaptable to be moved longitudinally on said rod when the threaded portions on said barrel are out of engagement with the threaded portions on said rod, a flange on one end of said barrel extending outwardly from the axis of said barrel, the remaining portion of said barrel throughout its entire length being provided with threads on the outside surface thereof, a micrometer member threaded on the outside surface of said barrel, said member having a height less than the length of said remaining portion of said barrel, the side of said micrometer member opposite the other end of said barrel providing a stop surface, a locator projecting outwardly from the flange on said barrel which is effective upon rotation of the threaded portions of said barrel on the threaded portions of said rod to engage the abutment on the machine tool thereby limiting the rotation of said barrel on said rod to an angular extent which is less than 360 degrees, and an adjustable lock screw extending through said flange for fixing said barrel on said rod at a position determined by said locator and the abutment, said micrometer member being adjustable on said barrel to accurately locate said stop surface in between the lead of the threads on the outside surface of said barrel.

References Cited in the file of this patent

UNITED STATES PATENTS

| | | |
|---|---|---|
| 1,390,904 | Hazelton | Sept. 13, 1921 |
| 1,391,633 | Hazelton | Sept. 20, 1921 |
| 2,318,691 | Huthsing | May 11, 1943 |
| 2,736,227 | Stroble | Feb. 28, 1956 |

FOREIGN PATENTS

| | | |
|---|---|---|
| 189,626 | Great Britain | Dec. 7, 1922 |
| 655,055 | France | Dec. 8, 1928 |